United States Patent
Kim et al.

(10) Patent No.: US 10,956,646 B2
(45) Date of Patent: Mar. 23, 2021

(54) CUSTOMIZING CIRCUIT LAYOUT DESIGN RULES FOR FABRICATION FACILITIES

(71) Applicant: TEXAS INSTRUMENTS INCORPORATED, Dallas, TX (US)

(72) Inventors: Tae S. Kim, Dallas, TX (US); Gregory B. Shinn, Dallas, TX (US)

(73) Assignee: TEXAS INSTRUMENTS INCORPORATED, Dallas, TX (US)

(*) Notice: Subject to any disclaimer, the term of this patent is extended or adjusted under 35 U.S.C. 154(b) by 425 days.

(21) Appl. No.: 15/782,673

(22) Filed: Oct. 12, 2017

(65) Prior Publication Data
US 2019/0114383 A1    Apr. 18, 2019

(51) Int. Cl.
*G06F 30/398*    (2020.01)
*H01L 27/02*    (2006.01)
*G06F 17/18*    (2006.01)
*G06F 119/18*    (2020.01)

(52) U.S. Cl.
CPC ............ *G06F 30/398* (2020.01); *G06F 17/18* (2013.01); *H01L 27/0207* (2013.01); *G06F 2119/18* (2020.01)

(58) Field of Classification Search
CPC .................................................. G06F 30/398
USPC ........................................................ 716/55
See application file for complete search history.

(56) References Cited

U.S. PATENT DOCUMENTS

| 8,255,858 | B2* | 8/2012 | Huang .................... H01G 4/33 257/303 |
| 2009/0031271 | A1* | 1/2009 | White ................. G06F 17/5068 716/122 |
| 2010/0306719 | A1* | 12/2010 | Smayling ............. G06F 30/398 716/136 |
| 2014/0351779 | A1* | 11/2014 | Ren ..................... G06F 17/5068 716/115 |

* cited by examiner

*Primary Examiner* — Eric D Lee
(74) *Attorney, Agent, or Firm* — Ray A. King; Charles A. Brill; Frank D. Cimino

(57) ABSTRACT

In some embodiments, a method includes selecting, a first circuit layout, where the first circuit layout includes a circuit element representation, a design rule, and a target circuit element value. The method further includes receiving a plurality of circuit element values of circuit elements fabricated in each of multiple fabrication facilities using the design rule. The method also includes selecting a fabrication facility and a circuit element value of circuit elements fabricated in the selected fabrication facility using the design rule. Further the method includes determining a circuit element value calculation based on the selected circuit element values, and determining an adjustment value. This adjustment value is further used to customize the design rule. The method then includes generating a second circuit layout comprising the customized design rule, causing the fabrication facility to fabricate a circuit using the second circuit layout.

20 Claims, 2 Drawing Sheets

CUSTOMIZING CIRCUIT LAYOUT DESIGN RULES FOR FABRICATION FACILITIES

BACKGROUND

Semiconductor circuits are fabricated on silicon wafers in fabrication facilities. For economic reasons, semiconductor circuit designers may commission multiple fabrication facilities (sometimes referred to as "fabs") to fabricate semiconductor circuits using a common circuit layout. Different fabrication facilities may utilize different fabrication processes. For example, a fabrication process to fabricate a semiconductor circuit at a first fabrication facility may differ from the fabrication process to fabricate the same circuit at a second fabrication facility.

SUMMARY

According to an embodiment, a method includes selecting, at least in part by a computer system, a first circuit layout, where the first circuit layout includes a circuit element representation, a design rule pertaining to the circuit element representation, and a target circuit element value pertaining to the circuit element representation. The method further includes receiving, at least in part by the computer system, a plurality of circuit element values of circuit elements fabricated in each of multiple fabrication facilities using the design rule. The method also includes selecting, at least in part by the computer system, a fabrication facility from the multiple fabrication facilities. The method further includes selecting, at least in part by the computer system, circuit element values of circuit elements fabricated in the selected fabrication facility using the design rule. Further the method includes determining, at least in part by the computer system, a circuit element value calculation based on the selected circuit element values. The method also includes determining, at least in part by the computer system, an adjustment value based on a difference between the circuit element value calculation and the target circuit element value. The method includes customizing, at least in part by the computer system, the design rule based on the adjustment value. The method also includes generating, at least in part by the computer system, a second circuit layout comprising the customized design rule. Further the method includes causing, at least in part by the computer system, the fabrication facility to fabricate a circuit using the second circuit layout.

According to another embodiment, a method includes selecting a first circuit layout. The method further includes comparing a first circuit fabricated at a fabrication facility using the first circuit layout against a target capacitance range. Further the method includes customizing the first circuit layout for the fabrication facility based on the comparison to produce a second circuit layout. The method further includes causing the fabrication facility to fabricate a second circuit based on the second circuit layout. The method also includes identifying a parasitic capacitance present in the second circuit. Further the method includes modifying the second circuit layout based on the identified parasitic capacitance to produce a third circuit layout. The method also includes causing the fabrication facility to fabricate a third circuit based on the third circuit layout.

According to yet another embodiment, a system includes an input device, a network device, and a processor coupled to the input and network devices. The system further includes the processor to receive, via the input device, a selection of a first circuit layout, the first circuit layout including a capacitor representation, a design rule pertaining to the capacitor representation, and a target capacitance range pertaining to the capacitor representation. The processor further receives, via the network device, a plurality of capacitance values of capacitors fabricated in each of multiple fabrication facilities using the design rule. The processor also receives, via the input device, a selection of a fabrication facility from among the multiple fabrication facilities. The processor further receives, via the input device, a selection of capacitance values from among the plurality of capacitance values corresponding to the selected fabrication facility. The processor then determines a capacitance value calculation based on the selected capacitance values. The processor also then determines an adjustment value based on a difference between the capacitance value calculation and the target capacitance range. The processor further modifies the design rule based on the adjustment value, generate a second circuit layout comprising the modified design rule, and transmit the second circuit layout to the selected fabrication facility via the network device.

BRIEF DESCRIPTION OF THE DRAWINGS

For a detailed description of various embodiments, reference will now be made to the accompanying drawings.

DETAILED DESCRIPTION

Figure 1:
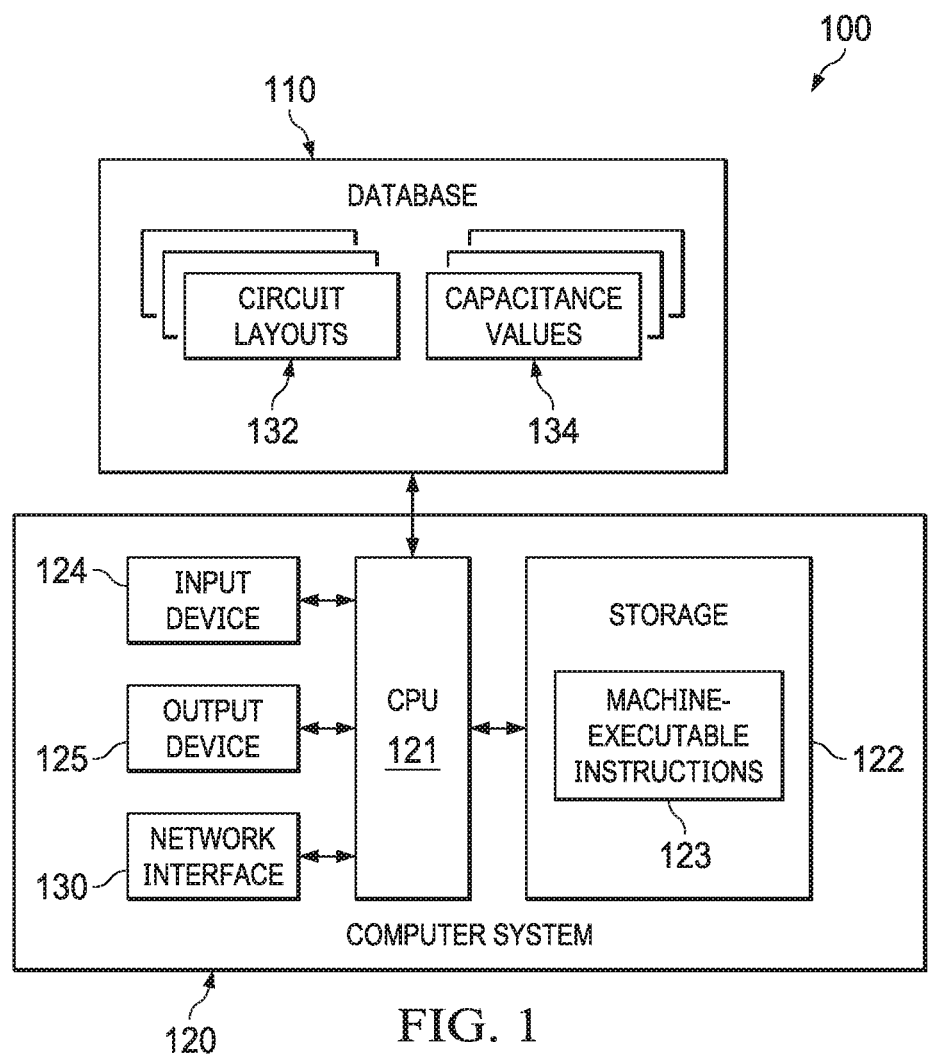
FIG. 1 is a block diagram of an illustrative circuit layout customization system, in accordance with various embodiments.

As noted above, different fabrication facilities may employ different techniques to fabricate a semiconductor circuit, thus resulting in unintended differences between the fabricated circuits. For example, a circuit layout may specify that a particular capacitor has a target capacitance value of 1 pF, but—due to differences in equipment and manufacturing techniques—a first fabrication facility may produce a circuit with a 1.1 pF capacitor and a second fabrication facility may produce a circuit with a 0.9 pF capacitor. To accommodate such mismatches between circuit element values of circuit elements fabricated in different fabrication facilities, circuit designers often design circuit layouts such that the fabricated circuit elements will have values that can lie within wide ranges, which are referred to herein as "tolerance ranges."

The difficulties described above generally occur when multiple fabrication facilities receive the same circuit layout for a semiconductor circuit to be fabricated. However, a single circuit layout can be customized for each of a plurality of fabrication facilities so that the fabrication facilities produce circuits with circuit elements that more closely align with target circuit element values, thus lowering tolerance ranges and inter-fabrication facility mismatches. Accordingly, the systems and methods disclosed herein are directed to receiving a circuit layout and dynamically customizing the circuit layout for each of a plurality of fabrication facilities based on the known manufacturing tendencies of each fabrication facility. For example, the disclosed systems and methods may reduce the tine length of a capacitor in a particular circuit layout for a fabrication facility that is known to produce capacitors with capacitances exceeding a target capacitance value. Conversely, the disclosed systems and methods may increase the tine length of that capacitor in the circuit layout for a different fabrication facility that has a tendency to produce capacitors with capacitance values exceeding the target capacitance value. Thus, for instance, the first illustrative fabrication facility mentioned above that typically produces a capacitor with a capacitance value of 1.1 pF may instead produce a capacitor with a capacitance value of 1.01 pF, which is more closely aligned with the target capacitance value of 1.0 pF. Similarly, the second illustrative fabrication facility mentioned above that generally produces a capacitor with a capacitance value of 0.9 pF may instead produce a capacitor with a capacitance value of 0.99 pF, which is more closely aligned with the target capacitance value of 1.0 pF. In this way, inter-fabrication facility mismatches are mitigated and, as a result, tolerance ranges for circuit layouts may be narrowed. Although this disclosure often describes such fab-specific circuit layout customization in the context of capacitors, such techniques may be readily adapted for any type of circuit element (e.g., resistors, transistors, diodes, inductors).

FIG. 1 is a block diagram of an illustrative circuit layout customization system 100 that is able to dynamically customize circuit layouts for each of a plurality of fabrication facilities. The circuit customization system 100 includes a database 110 and a computer system 120. The database 110 may comprise any suitable type of a non-transitory computer-readable medium, such as random access memory (RAM), a thumb drive, a compact disc, or an external hard drive, which stores data pertaining to multiple semiconductor circuits that were previously fabricated in different fabrication facilities. For example, the database 110 may store circuit layouts 132, which contain information about the circuit elements (e.g., one or more capacitors) of the previously fabricated semiconductor circuits. In some embodiments, such a circuit layout may include information that specifies the number, type, and connections of various circuit elements in the circuit; design rules specifying parameters (e.g., geometric parameters) of such circuit elements (e.g., in the case of capacitors, design rules may include tine length, cross-sectional area, capacitor plate area, etc.); and a target value pertaining to each such circuit element (e.g., a target capacitance value for each capacitor, or a target resistance value for each resistor).

In some embodiments, the database 110 also stores historical information pertaining to prior attempts to fabricate semiconductor circuits based on the stored circuit layouts. For example, the database 110 may store a circuit layout that was previously fabricated in three different fabrication facilities, and the database 110 may additionally store data pertaining to the circuits manufactured by those three facilities based on the circuit layout in question. In some embodiments, such historical semiconductor circuit fabrication data is categorized according to the fabrication facilities used to fabricate the semiconductor circuits. For example, the database 110 may store a capacitance value of a particular capacitor unit present in each of a set of semiconductor circuits fabricated by fabrication facilities FAB 1-FAB N, and it may categorize such values by fabrication facility. In the example of FIG. 1, such previous semiconductor circuit fabrication data is depicted as capacitance values 134. As previously explained, however, the scope of this disclosure is not restricted to the customization of circuit layouts for capacitors only, and the techniques described herein may be applied to all suitable types of circuit elements.

The database 110 may store the aforementioned types of data, as well as any other suitable types of information, in one or more data structures (e.g., tables), although the scope of this disclosure is not limited as such. Any suitable entity may provide information for storage in the database 110, such as a circuit designer, a programmer, or the computer system 120, which is now described.

The computer system 120 customizes circuit layouts using information stored in the database 110. The computer system 120 may include a central processing unit (CPU) 121 and storage 122 (e.g., RAM, read-only memory ROM)), which may include any suitable type of non-transitory computer-readable medium storing machine-executable instructions 123. The machine-executable instructions 123, when executed by the CPU 121, cause the CPU 121 to perform one or more of the actions attributed herein to the computer system 120. The computer system 120 may additionally include an input device 124 (e.g., touch screen, mouse, keyboard, audio input) and an output device 125 (e.g., a display, audio output) via which a user may interact with the computer system 120. The computer system 120 also may comprise a network interface 130 via which the computer system 120 may communicate with one or more other computer systems that are either co-located with the computer system 100 or are located in one or more other locations (e.g., a distributed computer system). For example, the computer system 120 may receive and/or transmit circuit layouts and/or historical data pertaining to previously fabricated circuits that were fabricated using one or more fabrication facilities via the network interface 130. In some embodiments, the computer system 120 comprises a cognitive computing system with a neurosynaptic hardware architecture and machine-executable instructions 123 that facilitate machine learning and probabilistic algorithms. The computer system 120 may be a monolithic computer system (e.g., a single device), or it may comprise multiple, separate components, or it may comprise a distributed computer system that is located in multiple, separate locations. The computer system 120 may comprise multiple different sub-systems, including computer sub-systems and non-computer sub-systems (e.g., machinery to perform actions with tangible objects). The computer system 120 may perform its functions in a fully autonomous manner, or it may perform its functions in a semi-autonomous manner (e.g., with human assistance).

As mentioned above, traditionally, all fabrication facilities receive the same circuit layout. However, the computer system 120 can customize a circuit layout for each of a plurality of fabrication facilities. As discussed below, the computer system 120 can generate a customized layout for each of multiple fabrication facilities after performing computations with historical data corresponding to each fabrication facility and adjusting geometric characteristics of the circuit element in question (e.g., capacitor element) for each of the fabrication facilities, thus generating a separate layout file unique to each fabrication facility.

Figure 2:
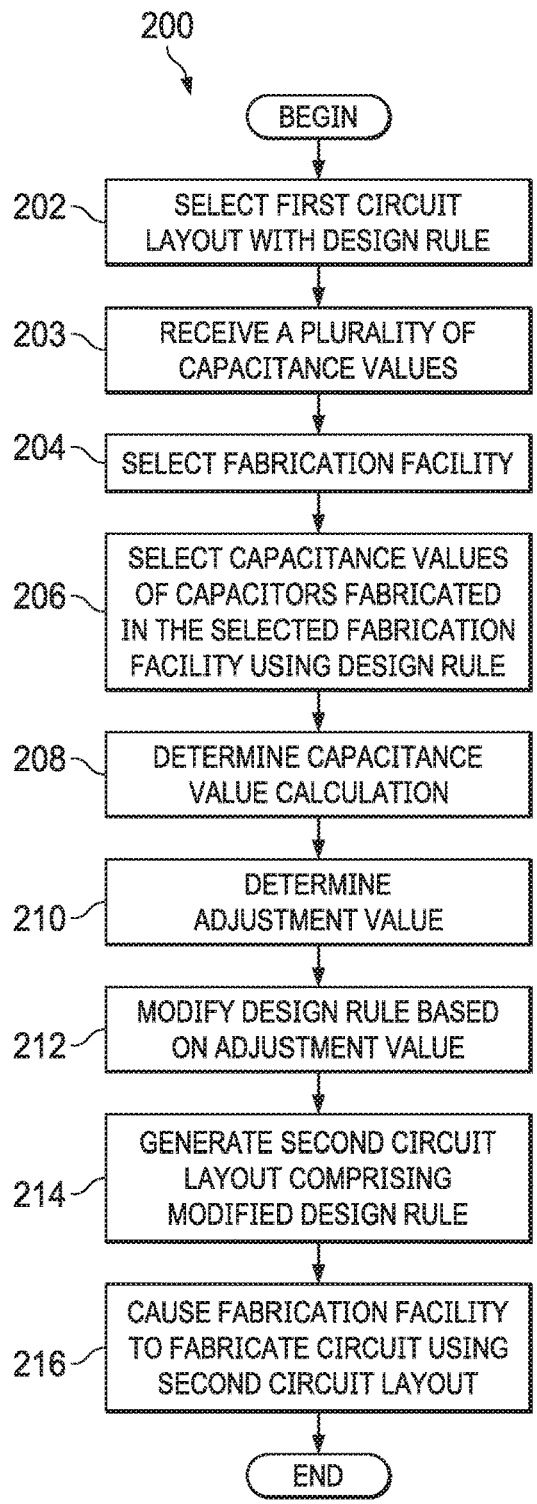
FIG. 2 is a flow diagram illustrating aspects of operations that can be performed by the circuit layout customization system, in accordance with various embodiments.

FIG. 2 is a flow diagram of an illustrative method 200. The method 200 describes an illustrative operation performed in tandem with the circuit customization system 100, and each of the steps of the method 200 may be performed by the CPU 121 as a result of executing the machine-executable instructions 123. The method 200 begins with selecting a first circuit layout comprising a design rule (step 202). The first circuit layout may be stored in the database 110 or in another local or remote storage accessed, for instance, via the network interface 130. The first circuit layout may be chosen, for example, by a user of the circuit customization system 100 interacting with the input device 124. In some embodiments, the first circuit layout is chosen automatically by the CPU 121 as a result of executing the machine-executable instructions 123.

The first circuit layout comprises representations (e.g., illustrations, descriptions) of various circuit elements (e.g., capacitors, resistors, transistors) and the manner in which they may be configured. The first circuit layout may also include a plurality of design rules. Each design rule specifies one or more parameters (e.g., geometric parameters) associated with a different circuit element representation. For example, the first circuit layout may include a capacitor representation, such as an illustration or textual description of a capacitor. In this example, the first circuit layout may additionally include a design rule or rules specifying parameters pertaining to the capacitor representation, such as tine length, cross-sectional area, capacitor plate area, etc. Furthermore, the first circuit layout may include target values for the various circuit element representations, such as a target capacitance value for a capacitor representation, or a target capacitance range for the capacitor representation. The first circuit layout may be generated by any suitable entity, such as a circuit designer, a programmer, a computer (e.g., a cognitive computer), and the like.

The method 200 further includes receiving a plurality of capacitance values (step 203). The plurality of capacitance values may be stored in the database 110 or in another local or remote storage accessed, for instance, via the network interface 130. The plurality of capacitance values may include capacitance values of circuits fabricated using the first circuit layout using multiple fabrication facilities. The capacitance values may be received, for example, by the circuit customization system 100 automatically by the CPU 121 as a result of executing the machine-executable instructions 123 as a result of selecting the first circuit layout, as described in step 202.

The method 200 may next include selecting a fabrication facility (step 204) from multiple fabrication facilities. The selected fabrication facility may be the one for which a circuit layout is to be customized. The fabrication facility may be selected automatically by the CPU 121 as a result of executing the machine-executable instructions 123. In some embodiments, the fabrication facility may be selected by a user of the circuit customization system 100 via the input device 124. For example, the user may interact with a menu displayed on a graphical user interface via the output device 125 to select a fabrication facility.

The method 200 may additionally comprise selecting capacitance values of capacitors previously fabricated in the selected fabrication facility according to the design rule (step 206). More specifically, the method 200 assumes that the first circuit layout selected in step 202 has previously been used by the fabrication facility selected in step 204 to fabricate one or more circuits. Records regarding the fabricated circuits—in particular, the actual capacitance value of the relevant capacitor in each circuit—may be stored, for example, in the database 110. Such records are useful to determine the error range of the selected fabrication facility—that is, the extent to which the fabrication facility fails to produce a capacitor having the target capacitance value. For example, such records may reveal that the selected fabrication facility, when fabricating a circuit according to the first circuit layout (and, in particular, according to the design rule(s) for the relevant capacitor in the first circuit layout), routinely produces a capacitor with an actual capacitance value of 10 pF, while the target capacitance value specified in the first circuit layout was 5 pF. These records indicate that the selected fabrication facility has one or more flaws in its fabrication process or equipment that results in a +5 pF error when fabricating circuits based on the first circuit layout and the design rules therein. In some embodiments, the CPU 121, as a result of executing the machine-executable instructions 123, may retrieve such capacitance values from records stored in the database 110. Other storage locations for such records are contemplated and fall within the scope of this disclosure. If multiple such capacitance values are retrieved after the selection step (206), the CPU 121 may perform a mathematical calculation on the multiple capacitance values. For example, the CPU 121 may determine an average or a median of such values. The result of such a mathematical calculation may be referred to herein as a "capacitance value calculation," as indicated in step 208 of method 200. The precise capacitance values that are retrieved in step 206 may be customized based on, for instance, number of values, dates on which values are measured, and dates on which circuits were previously fabricated, and such customization may be specified by a user operating the computer system 120.

The method 200 further comprises determining an adjustment value (step 210). In some embodiments, the CPU 121 may perform this step as a result of executing the machine-executable instructions 123. An adjustment value is the difference between the capacitance value received in step 206 (or the capacitance value calculation, in the case of multiple received capacitance values) and the target capacitance value. More specifically, the adjustment value is the adjustment required for the received capacitance value (or capacitance value calculation) to reach the target capacitance value (or target capacitance range). In the example above, the selected fabrication facility routinely produces capacitors with actual capacitance values of 10 pF, while the target capacitance value is 5 pF. In this example, the adjustment value would be −5 pF. If the first circuit layout specified a target capacitance range of 5-8 pF in lieu of specifying a target capacitance value, the CPU 121 may determine the adjustment value to be −2 pF, since a reduction of 2 pF in the actual capacitance values would result in a capacitance value within the 5-8 pF range.

The method 200 next includes modifying a design rule based on the adjustment value calculated in step 210 (step 212). For example, if the design rule for the relevant capacitor in the first circuit layout specifies a particular tine length, a particular capacitor plate area, and a particular cross-sectional area and that design rule results in fabricated circuit capacitors that require adjustment because they are not at the target capacitance value or within the target capacitance range, the design rule may be modified to reduce the adjustment value to zero or as close as possible to zero. For instance, capacitor fabrication at a particular fabrication facility may result in actual capacitance values of 10 pF, while the target capacitance value is only 5 pF. In this case, an adjustment value is −5 pF is required. To achieve such adjustment, one or more aspects of the design rule for the capacitor—for example, tine length—may be modified (e.g., reduced) to reduce the capacitance of the next capacitor fabricated by that same fabrication facility according to the modified design rule. The design rule may be modified by, e.g., the CPU 121 executing the machine-executable instructions 123.

The method 200 next comprises generating a second circuit layout comprising the modified design rule (step 214). The second circuit layout may be similar or identical to the first circuit layout in multiple respects, but, at a minimum, the second circuit layout may include the design rule as modified in step 212. The CPU 121 may perform this step as a result of executing the machine-executable instructions 123, and the CPU 121 may store the second circuit layout, including the modified design rule, in the database 110 as part of circuit layouts 132. Alternatively, the CPU 121 may store the second circuit layout in the storage 122 or in any other suitable storage. Finally, the method 200 comprises causing the fabrication facility selected in step 204 to fabricate a circuit using the second circuit layout generated in step 214 (step 216). The CPU 121 may perform the step 216 by, for instance, transmitting the second circuit layout to the fabrication facility. Some or all of the steps of method 200 may be repeated as necessary to converge on a modified design rule that achieves a fabricated circuit element value (e.g., capacitance value) that matches a target value (e.g., target capacitance value) or that is within a target value range (e.g., a target capacitance value range). The method 200 may be modified as desired and as may be appropriate, including by adding, deleting, modifying, or rearranging one or more steps.

Figure 3:
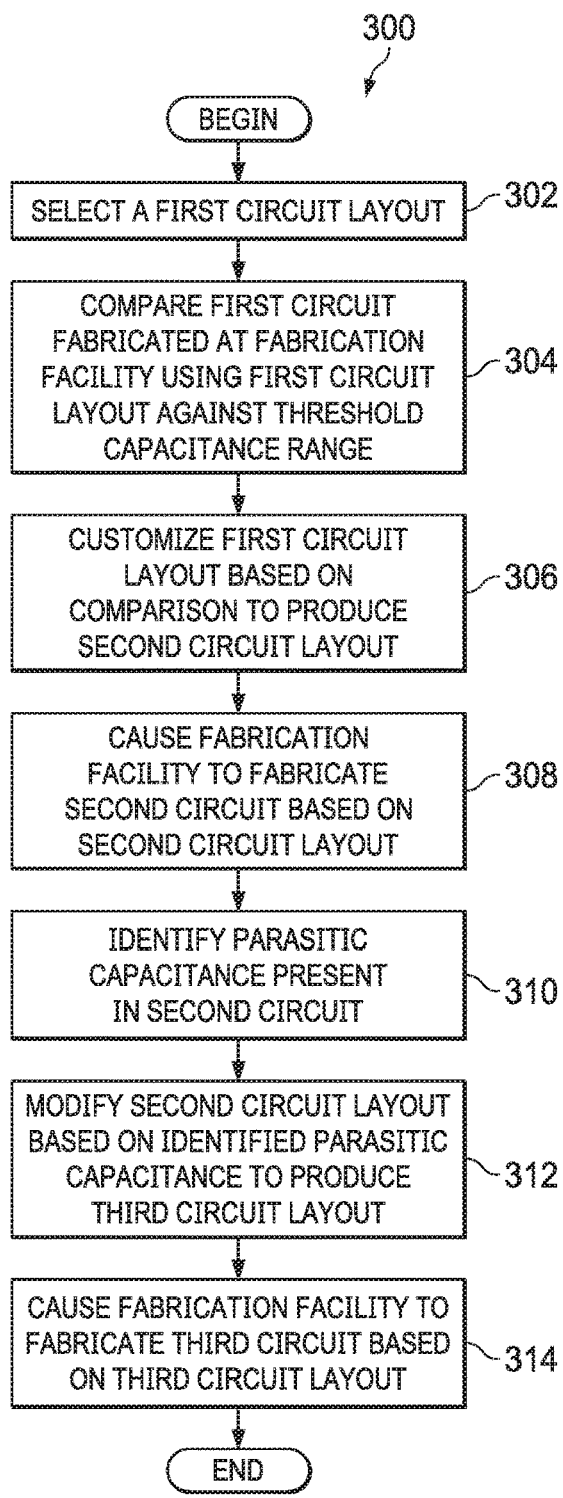
FIG. 3 is another flow diagram illustrating aspects of operations that can be performed by the circuit layout customization system, in accordance with various embodiments.

FIG. 3 is a flow diagram of an illustrative method 300. The method 300 describes an illustrative operation performed in tandem with the circuit customization system 100, and each of the steps of the method 300 may be performed by the CPU 121 as a result of executing the machine-executable instructions 123. As with the method 200, the steps of the method 300 are described in the context of capacitors, but the method 300, like the method 200, may be adapted for application to any suitable circuit element. The method 300 may begin with selecting a first circuit layout (step 302). For example, a user may select a first circuit layout from among the circuit layouts 132 in database 110. Alternatively, in some embodiments, the user may select the first circuit layout from the storage 122. In some embodiments, a cognitive computer may select the first circuit layout from the database 110 or the storage 122. The method 300 may next comprise comparing a first circuit fabricated at a fabrication facility using the first circuit layout against a target capacitance value or a target capacitance range (step 304). This step may include, for instance, comparing an actual capacitance value of a capacitor in the fabricated circuit to a target capacitance value or a target capacitance range, as described above with respect to step 210. In some embodiments, an average, median, or other mathematical calculation of multiple capacitance values from multiple circuits fabricated at the same fabrication facility may be used in the comparison of step 304. The comparison performed in step 304 produces an adjustment value.

The method 300 additionally includes customizing the first circuit layout based on the comparison of step 304—that is, based on the adjustment value produced by performing step 304—to produce a second circuit layout (step 306). For instance, the CPU 121 may adjust one or more design rules in the first circuit layout based on the adjustment value to produce a second circuit layout that comprises the modified design rule(s). The method 300 further comprises causing the fabrication facility to fabricate a second circuit based on the second circuit layout (step 308).

The method 300 subsequently includes identifying one or more parasitic capacitances present in the second circuit that was fabricated in step 308 (step 310). Such parasitic capacitances may be identified by, e.g., laboratory personnel or by machines, such as robotic arms (not expressly depicted in the figures) controlled by the CPU 121 and having access to the appropriate equipment necessary to identify and measure parasitic capacitances. These parasitic capacitances may be identified in the vicinity of a capacitor in the fabricated circuit and may impact efforts to modify design rules to compensate for flaws in the fabrication equipment and/or processes of the fabrication facility. Stated another way, even after adjustments are made to one or more design rules based on an adjustment value calculated in step 304, parasitic capacitances in the circuit fabricated using the modified design rule(s) may prevent the actual capacitance of the capacitor in the circuit from matching the target capacitance value or falling within the target capacitance range. However, after identifying such parasitic capacitances in the second circuit that is fabricated using the modified design rule(s), the modified design rule(s) may be further fine-tuned to correct for the identified parasitic capacitances to the extent reasonably possible. Accordingly, the method 300 comprises modifying one or more design rules of the second circuit layout based on the identified parasitic capacitance(s) to produce a third circuit layout with one or more design rules that have again been modified (step 312). The method 300 also comprises causing the fabrication facility to fabricate a third circuit based on the third circuit layout produced in step 312 (step 314). The method 300 may be modified as desired and as may be appropriate, including by adding, deleting, modifying, or rearranging one or more steps of the method.

The terms "including" and "comprising" are used in an open-ended fashion, and thus should be interpreted to mean "including, but not limited to . . . ." Also, the term "couple" or "couples" is intended to encompass both indirect and direct wired and wireless connections. Thus, if a first device couples to a second device, that connection may be through a direct connection or through an indirect connection via other devices and connections. The above discussion is meant to be illustrative of the principles and various embodiments of the present disclosure. Numerous variations and modifications are possible. It is intended that the following claims be interpreted to embrace all such variations and modifications.

What is claimed is:
1. A method comprising:
generating, at least in part by a computer system, a unique customized circuit layout for each of multiple;
selecting, at least in part by a computer system, a first circuit layout, the first circuit layout including a circuit element representation, a design rule pertaining to the circuit element representation, and a target circuit element value pertaining to the circuit element representation;
receiving, at least in part by the computer system, a plurality of circuit element values of circuit elements fabricated in each of multiple fabrication facilities using the design rule;
selecting, at least in part by the computer system, a fabrication facility from the multiple fabrication facilities;
selecting, at least in part by the computer system, circuit element values of circuit elements fabricated in the selected fabrication facility using the design rule;
determining, at least in part by the computer system, a circuit element value calculation based on the selected circuit element values;
determining, at least in part by the computer system, an adjustment value based on a difference between the circuit element value calculation and the target circuit element value;

customizing, at least in part by the computer system, the design rule based on the adjustment value;

generating, at least in part by the computer system, a second circuit layout comprising the customized design rule; and causing, at least in part by the computer system, the fabrication facility to fabricate a circuit using the second circuit layout.

2. The method of claim 1, wherein determining the circuit element value calculation comprises averaging the selected circuit element values.

3. The method of claim 1, wherein determining the circuit element value calculation comprises determining a median of the selected circuit element values.

4. The method of claim 1, wherein the circuit element representation comprises a capacitor representation, and wherein customizing the design rule comprises adjusting a tine length pertaining to the capacitor representation.

5. The method of claim 1, wherein the circuit element representation comprises a capacitor representation, and wherein customizing the design rule comprises adjusting an area of a capacitor plate area pertaining to the capacitor representation.

6. The method of claim 1, wherein the circuit element representation comprises a capacitor representation, and wherein customizing the design rule comprises adjusting a cross-sectional area pertaining to the capacitor representation.

7. The method of claim 1, further comprising identifying a parasitic capacitance in the fabricated circuit and customizing the customized design rule to produce another design rule.

8. The method of claim 7, further comprising generating, at least in part by the computer system, a third circuit layout comprising the another design rule and causing, at least in part by the computer system, the fabrication facility to fabricate another circuit using the third circuit layout.

9. The method of claim 1, wherein the circuit elements comprise capacitors.

10. The method of claim 1, wherein the selected circuit element values comprise capacitance values.

11. A method comprising:
generating a unique customized circuit layout for each of multiple fabrication facilities using historical data corresponding to each of the respective fabrication facilities;
selecting a first circuit layout;
comparing a first circuit fabricated at a fabrication facility using the first circuit layout against a target capacitance range;
customizing the first circuit layout for the fabrication facility based on the comparison to produce a second circuit layout;
causing the fabrication facility to fabricate a second circuit based on the second circuit layout;
identifying a parasitic capacitance present in the second circuit;
modifying the second circuit layout based on the identified parasitic capacitance to produce a third circuit layout; and
causing the fabrication facility to fabricate a third circuit based on the third circuit layout.

12. The method of claim 11, wherein customizing the first circuit layout comprises adjusting a capacitor tine length in the first circuit layout.

13. The method of claim 11, wherein customizing the first circuit layout comprises adjusting a capacitor plate area in the first circuit layout.

14. The method of claim 11, wherein customizing the first circuit layout comprises adjusting a capacitor cross-sectional area in the first circuit layout.

15. The method of claim 11, wherein the first circuit layout specifies the target capacitance range.

16. The method of claim 11, wherein comparing the first circuit against the target capacitance range comprises comparing a capacitance in the first circuit against the target capacitance range.

17. A system comprising:
an input device;
a network device; and
a processor coupled to the input and network devices, the processor to:
generate a unique customized layout for each of multiple fabrication facilities using historical data corresponding to each of the respective fabrication facilities;
receive, via the input device, a selection of a first circuit layout, the first circuit layout including a capacitor representation, a design rule pertaining to the capacitor representation, and a target capacitance range pertaining to the capacitor representation;
receive, via the network device, a plurality of capacitance values of capacitors fabricated in each of multiple fabrication facilities using the design rule;
receive, via the input device, a selection of a fabrication facility from among the multiple fabrication facilities;
receive, via the input device, a selection of capacitance values from among the plurality of capacitance values corresponding to the selected fabrication facility;
determine a capacitance value calculation based on the selected capacitance values;
determine an adjustment value based on a difference between the capacitance value calculation and the target capacitance range;
modify the design rule based on the adjustment value;
generate a second circuit layout comprising the modified design rule; and
transmit the second circuit layout to the selected fabrication facility via the network device.

18. The system of claim 17, wherein the capacitance value calculation is selected from the group consisting of a mean calculation and a median calculation.

19. The system of claim 17, wherein, to modify the design rule, the processor is to perform an action selected from the group consisting of: adjust a tine length of the capacitor representation; adjust a capacitor plate area of the capacitor representation; and
adjust a cross-sectional area of the capacitor representation.

20. The system of claim 17, wherein the processor is to modify the second circuit layout based on a parasitic capacitance detected in a circuit fabricated in the selected fabrication facility based on the second circuit layout.

* * * * *